US008807322B2

(12) United States Patent
Cassoni

(10) Patent No.: US 8,807,322 B2
(45) Date of Patent: Aug. 19, 2014

(54) APPARATUS FOR TRANSPORTING OBJECTS

(75) Inventor: Robert Paul Cassoni, Washington, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 159 days.

(21) Appl. No.: 13/490,691

(22) Filed: Jun. 7, 2012

(65) Prior Publication Data

US 2013/0327615 A1 Dec. 12, 2013

(51) Int. Cl.
*B65G 47/26* (2006.01)
*B65G 21/14* (2006.01)
*B65G 15/26* (2006.01)
*B65G 13/12* (2006.01)

(52) U.S. Cl.
CPC .............. *B65G 21/14* (2013.01); *B65G 15/26* (2013.01); *B65G 13/12* (2013.01)
USPC ..................................... 198/460.1; 198/460.2

(58) Field of Classification Search
CPC ............. B65G 21/14; B65G 2203/042; B65G 2201/02; B65G 2201/0244; B65G 47/088; B65G 15/26; B65G 13/12; B65G 47/26; B65G 47/15131
USPC ........................................... 198/460.1, 460.2
See application file for complete search history.

(56) References Cited

U.S. PATENT DOCUMENTS

| | | | |
|---|---|---|---|
| 5,147,027 A * | 9/1992 | Cruver ........................ | 198/419.3 |
| 5,322,154 A * | 6/1994 | Lenherr ...................... | 198/460.2 |
| 5,699,651 A | 12/1997 | Miller et al. | |
| 5,829,574 A * | 11/1998 | DelSanto ................... | 198/460.2 |
| 5,906,265 A * | 5/1999 | Spatafora ................... | 198/460.2 |
| 6,640,961 B2 * | 11/2003 | Cavallari ................... | 198/460.2 |
| 7,341,141 B2 * | 3/2008 | Spatafora ................... | 198/460.2 |
| 7,673,436 B2 * | 3/2010 | Bershadsky et al. ....... | 198/460.2 |
| 2003/0196871 A1 * | 10/2003 | Jones, Jr. ................... | 198/460.2 |
| 2005/0000188 A1 | 1/2005 | Spatafora et al. | |

FOREIGN PATENT DOCUMENTS

| | | |
|---|---|---|
| EP | 2364916 A1 | 9/2011 |
| NL | 9500333 A | 10/1996 |

OTHER PUBLICATIONS

International search report dated Jul. 22, 2013, 10 pages.

* cited by examiner

*Primary Examiner* — James R Bidwell
(74) *Attorney, Agent, or Firm* — David K Mattheis; Kim W Zerby

(57) ABSTRACT

An object transport apparatus comprises a transport conveyor. Objects are compelled to move through an object space adjacent to the transport conveyor. A plurality of flights is disposed along a variable path and constrained to move along that path. A variable portion of the path is disposed adjacent to the transport conveyor. The flights disposed along the adjacent portion occupy a portion of the object space of the transport conveyor. A first transfer element is disposed along the variable path. The motion of the first transfer element varies the length of the variable path adjacent to the transport conveyor. An object sensor is disposed to detect objects upstream of the transfer element in the object space of the transport element. A controller interacts with a transfer element drive to alter the position of the transfer element along the variable path according to the output of the sensor.

16 Claims, 3 Drawing Sheets

APPARATUS FOR TRANSPORTING OBJECTS

FIELD OF THE INVENTION

The invention relates to the handling and transport of discrete objects. The invention relates particularly to imparting a predefined object spacing to transported objects.

BACKGROUND OF THE INVENTION

Modern manufacturing processes often require that discrete objects be transported between unit operations. The objects may comprise a packaged good or a portion of the packaged good such as a primary or secondary package element. Particular unit operations in the manufacturing process may have specific requirements regarding the manner in which objects are provided to the operation. Containers, caps, cartons, sheet goods and other discrete items may benefit from a handling system which enables the provision to the unit operations of the objects at a predetermined spacing between objects. An apparatus which can consistently provide objects at a predetermined spacing is desired.

SUMMARY OF THE INVENTION

An object transport apparatus comprises a transport conveyor. Objects are compelled to move through an object space adjacent to the transport conveyor. One or more object capture elements is disposed along a variable path and constrained to move along that path. A variable portion of the path is disposed adjacent to the transport conveyor. The object capture element(s) disposed along the adjacent portion occupy a portion of the object space of the transport conveyor. A first transfer element is disposed along the variable path. The motion of the first transfer element varies the length of the variable path adjacent to the transport conveyor. An object sensor is disposed to detect objects upstream of the transfer element in the object space of the transport element. A controller interacts with a transfer element drive to alter the position of the transfer element along the variable path according to the output of the sensor.

DETAILED DESCRIPTION OF THE INVENTION

Figure 1:
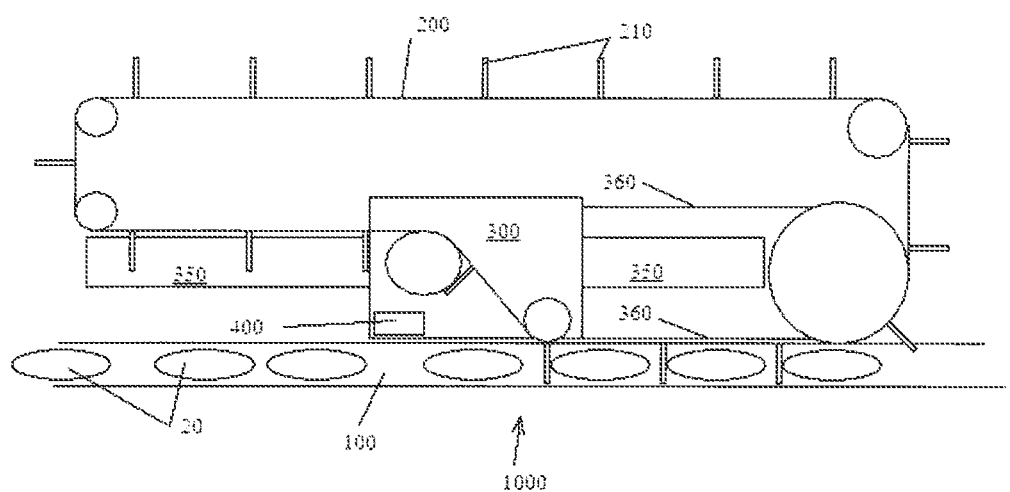
FIG. 1 is a schematic plan view of a first embodiment of the invention.

In one aspect, the invention comprises an object transport apparatus. The apparatus comprises a transport conveyor, at least one object capture element, a first transfer element, an object sensor, and a controller. The transport conveyor compels and transports objects through an object space adjacent to the conveyor. The objects may be compelled via interaction with a moving fluid as is the case with air conveying systems. The objects may be compelled via interaction with a moving conveying element such as a table-top or other linked chain, or a low-friction belt. In any of these embodiments, the objects may proceed through the object space at a velocity equal to or less than the full compelled velocity.

The objects may slide or slip along one or more support elements and may proceed at a velocity equal to or less than the velocity of the moving fluid. Similarly, the objects may slide upon the surface of the conveying element at a velocity equal to or less than that of the conveying element. In one embodiment the object capture element comprises a plurality of flights disposed at regular intervals upon a carrier belt or chain. The plurality of flights are compelled to traverse a closed path. The spacing is substantially maintained as the flights are compelled to follow the closed path. The flights proceed along the path from an upstream direction to a downstream direction. Along a variable portion of the path the flights interfere with the object space of the transport conveyor dividing the object space into a series of discrete sub-spaces proceeding from upstream toward the downstream direction. The flights are spaced to create sub-spaces at least large enough to accommodate the objects to be transported.

The flights may extend from the flight carrying element in any orientation suitable to the objects being controlled. In one embodiment, the flights extend horizontally from a substantially vertical flight carrying belt. In another embodiment, the flights extend horizontally from a substantially horizontal flight carrying element.

The flights may comprise cantilevered protuberances extending normally from a continuous belt or linked chain which is in turn compelled to traverse the path by a drive system. The belt or chain is considered the flight carrying element.

In one embodiment the flights may comprise flight elements attached to a moving support structure. In one embodiment the support structure comprises a series of tubes or rods. The series is captured between a pair of opposing and parallel chains which transport the series around a closed loop. The flight elements are each constrained either upon a single rod or by connection to a plurality of the rods. As the assembly moves along the loop, the flight elements may translate along the rods in a direction normal to the direction of travel of the assembly. This translation may be achieved via the motion of a cam follower attached to the flight element and moving along a cam track.

In each embodiment the position of the individual flights varies from a first non-interfering position with respect to the object space of the transport conveyor through a transition zone along the variable path to a second interfering position with respect to the object space of the transport conveyor as the flights move along the path. The transition occurs at the first transfer element. The path of the flight carrying element or the position of the cam track is altered to cause the flights to transition. The position of the transfer element along the path may be varied as the object population of the transport conveyor fluctuates. The motion of the transfer element alters the number of flights interfering with the object space. As the transfer element moves upstream, more flights interfere with the object space. As the transfer element moves downstream the number of flights interfering with the object space decreases.

The flights are constrained to move along the variable path at a fixed speed. The fixed speed of the flights is less than the object transport speed of the transport conveyor. The objects captured in the sub-spaces slip with respect to the transport conveyor.

A sensor is disposed upstream of the transfer element to detect objects proceeding along the transport conveyor. The sensor may be an ultrasonic, electromagnetic, mechanical interference or other object detection sensor as these are known in the art. The output of the sensor is provided as an input to a controller. The controller evaluates the input and alters the position of the transfer element according to predetermined timing. As an example, the transfer element may be moved upstream a fixed distance after the passage of a predetermined amount of time has elapsed since the detection of the object. The motion of the transfer element enables the capture of the detected object in an object sub-space along the variable path of the flights in the interference portion of the object space.

In one embodiment, the sensor is disposed at a fixed location upstream of the transfer element. In this embodiment the controller tracks the position of the transfer element relative to the sensor to determine the timing necessary to properly adjust the position of the transfer element as the next object arrives to be captured by the flights. The position of the transfer element relative to the sensor may be tracked by having the controller note the initial or home position of the transfer element relative to the sensor and subsequently having the controller determine the motion of the transfer element by way of data received from a shaft encoder associated with the motion of the transfer element or by way of an encoder coupled to a drive unit associated with the motion of the transfer element. The timing may be determined using the known fixed speed of the transport conveyor and the calculated spacing between the transfer element and the sensor.

In one embodiment the sensor is coupled to the transfer element such that the relative position of the two remains fixed. In this embodiment, the timing of the adjustment of the position of the transfer element also remains fixed.

The transfer element moves downstream according to the timing of the transfer of the objects. As objects move along the transport conveyor the transfer element proceeds upstream or downstream as necessary to maintain the last interfering flight in a position to receive the next arriving object. When no additional objects are detected by the sensor, the transfer element will move downstream with the last object. As additional objects are detected, the transfer element will move upstream as necessary to accommodate the capture of the additional objects.

Captured objects proceed from the variable flighted portion of the transfer conveyor, evenly spaced and without gaps in the supply of objects, to the downstream unit operation infeed portion or downstream conveyor.

As objects are provided at a rate exceeding the supply rate of the transfer conveyor to the downstream portion of the object handling system, the transfer element is moved upstream to accommodate the capture of additional objects in sub-spaces within the object space. As the supply of objects drops below the supply rate the transfer element moves downstream to prevent the formation of an empty sub-space in the object space.

The motion of the transfer element is controlled independently of the motion of the carrier element or the transport/support element. The transfer element may be mechanically coupled to a ball screw element, a linear servo motor, a rack and pinion system or other form of linear actuator, a belt, a cable, a chain, or combinations of these or other motion-transfer elements.

In one embodiment, the transfer element may be disposed as a sliding element upon one or more guide rails. The transfer element may be mechanically coupled to a drive belt driven by a servo motor or stepper motor. The motor may receive a control signal from the controller to alter the position of the transfer element along the guide rails shifting the transfer element along an upstream-downstream axis. The rotation of the motor, together with any associated gearing system may be transferred to the belt via a sheave resulting in the motion of the transfer element. The belt, or belt in combination with the transfer element, may form a closed loop enabling the use of a continuous belt and providing bidirectional belt tension at the transfer element to better maintain the desired position of the transfer element. In this embodiment, the closed loop mechanical assembly reduces the impact of inertial forces upon the location of the transfer element. The belt could be a smooth belt or a lugged or timing belt. A timing belt may provide a more precise control of the position of the transfer element. A chain coupled to the motor using a sprocket could be utilized instead of the belt. A similar arrangement may be constructed utilizing a rolling element chain or a cable rather than a belt.

In one embodiment the apparatus may comprise additional sets of flights attached to additional carrying elements and traversing the same path. The set of carrying elements may thus be stacked such that the set may utilize common drive elements and such that the set will be constrained to follow the same flight element path. In this embodiment, the relative position of the respective sets of flights may be altered using timing sheaves, phasing hubs, or sprockets. By altering the relative positions of the sets of flights, a pattern of flights may be formed around each respective sub-space to enable a greater degree of conformity between the positions of the flights and the shape of the objects conveyed. As the relative position may be altered, the configuration may be changed as the conveyed objects are changed. In this manner, multiple points of contact with the conveyed object in any particular object sub-space may be arranged. Enabling these multiple contact points may provide the ability to stabilize otherwise unstable objects during the transfer operation. As an example, an object having a non-uniform trailing edge, such that all points on the trailing edge of the object do not lie along a common vertical line or in a common vertical plane, may be contacted at a first lower point by a first flight and at a second upper point not vertically aligned with the first lower point, by a second flight.

In embodiments comprising a flight carrying element, the stability of the motion of the carrying element and flights may be aided by the presence of a flight carrying element stabilizer. The stabilizer may be disposed in a face to face relationship with a back face of the flight carrying element away from the side of the carrying element where the flights are disposed. In one embodiment the stabilizer comprises a polymer element having sufficient flexibility that the element may be wrapped around a sheave such that the stabilizer is present in the face to face relationship along that portion of the variable path adjacent to the transport conveyor as well as the portion which wraps around the downstream sheave which constrains the flight carrying element to the path. The sheave that the stabilizer wraps around need not be the same as the ones that the flight carrying element wraps around. The stabilizer sheave may be upstream from the flight carrying element sheaves. A downstream end of the stabilizer may be coupled to the transfer element, either directly or via a cable, belt, chain or other connecting element, such that the motion of the transfer element induces a corresponding motion in the stabilizer and maintains the face to face relationship along that portion of the path. In one embodiment an upstream end of the stabilizer is coupled to the transfer element via a cable, belt, chain or other connecting element closing a loop consisting of the transfer element, the stabilizer, and the connecting element(s). In this embodiment the presence of the connecting element and the formation of the closed loop enables positive control of both the downstream and upstream ends of the stabilizer.

In one embodiment the transfer element comprises a portion of the cam track where the flights transition from the first position to the second position. In this embodiment, the transfer element may be coupled to any form of motion control element suitable to yield the necessary range of motion for the element. Exemplary motion control elements include without limitation, ball screw elements, linear actuator, rack and pinion systems hydraulic and pneumatic cylinders, belt/sheave systems, chain/sprocket combinations, combinations of these and other motion control devices. In this embodiment, the controller may alter the position of the transfer element and shift the cam track associated with the element to alter the extent the variable path intersects with the object space of the transport conveyor according to the input from the sensor.

In one embodiment the system may comprise a second transfer element moving in opposition to the first transfer element. In this embodiment, as first transfer element moves downstream reducing the portion of the variable path which is adjacent to the transport conveyor, the second transfer element moves upstream to maintain a constant overall variable path length.

In one embodiment, the apparatus comprises at least one primary object capture element along the variable path as described without flights. In this embodiment, the object capture elements may comprise belts having an object contact surface which extend into the object space adjacent to the transport conveyor. At least one secondary object capture element may be disposed opposite to the primary object element across the object space and along the path of the transport conveyor. The path of the secondary object capture element may be fixed. As objects are sensed and the transfer element shifts its position to alter the variable path, sensed objects are captured between the opposed object capture elements and carried forward along the transport conveyor object space by the object capture elements. In one embodiment, a mechanism may be disposed adjacent to the primary object capture element upon the transfer element to enable the spacing between the primary and secondary object capture elements to be altered at the time of object capture. The distance initially being increased to create a larger nip spacing between the primary and secondary elements as the sensed object enters the nip point. The distance being decreased subsequent to the entry to capture the object between the surfaces of the primary and secondary elements.

As captured objects reach the downstream end of the variable path they may be transferred to a re-pitching element. As used herein, re-pitching refers to a process whereby the relative spacing between discrete objects is altered from a first spacing or pitch to a second predetermined spacing or pitch.

In one embodiment the re-pitching element comprises at least one motion transfer element disposed along the object path and adjacent to the variable path. Objects may be transferred from the upstream portion of the apparatus to the re-pitching element. The transfer may include the use of a non-linear gear to open and close the spacing between the re-pitching motion transfer element and a second motion transfer element disposed opposite to the first or between the first motion transfer element and an object support element. The motion transfer elements may be any motion transfer element capable of traversing the path required for the objects. Exemplary motion transfer elements include v-belts, lug belts, timing belts and rolling element chains with and without object contacting attachment elements. The speed of the re-pitching motion transfer element(s) relative to the speed of the upstream object capture elements may be varied to re-pitch the objects. As each object is captured the re-pitching speed may be increased to alter the object pitch and decreased to match the upstream speed to receive the next object. A smoothing function may be used to reduce the levels of acceleration and accompanying jerk imparted to the objects during re-pitching. In one embodiment, an s-curve smoothing function is used to profile the speed change to reduce system jerk.

In one embodiment, the physical constraints arising from the sizes of the objects to be transported may constrain the mechanical elements utilized to construct the apparatus. In this embodiment, the transfer of power to drive elements may comprise the use of Schmidt offset drive couplings to transfer power between parallel shafts to drive object capture and or re-pitching belts. In one embodiment idler sprockets or pulleys may necessarily be disposed above the object capture and/or re-pitching belt and supported via a cantilevered structure to provide adequate object and/or flight clearance along the object and variable paths.

The motion of the object capture elements, transport conveying elements, re-pitching elements may be controlled by an industrial controller and supplied via hydraulic, pneumatic or electric motors. Electric motors may comprise AC, DC or Servo drive elements. The drive elements may be directly coupled to the driven elements or may be coupled via gear reducers as is known in the art.

EXAMPLES

As shown in FIG. 1, apparatus 1000, comprises carrier belt 200 supporting flights 210. The transport conveyor 100 carries objects 20 through an object space. The shuttle 300 is moved via actuator 350 as incoming objects are detected by the sensor 400. The movement of the shuttle 300 alters the number of flights 210 in the object space separating objects 20. Carrier support 360 is disposed adjacent to the flighted carrier 200 and moves in coordination with the shuttle 300 to maintain support for the flighted carrier belt 200 as the shuttle moves and varies the extent to which the carrier and flights pass through the object space.

Figure 2:
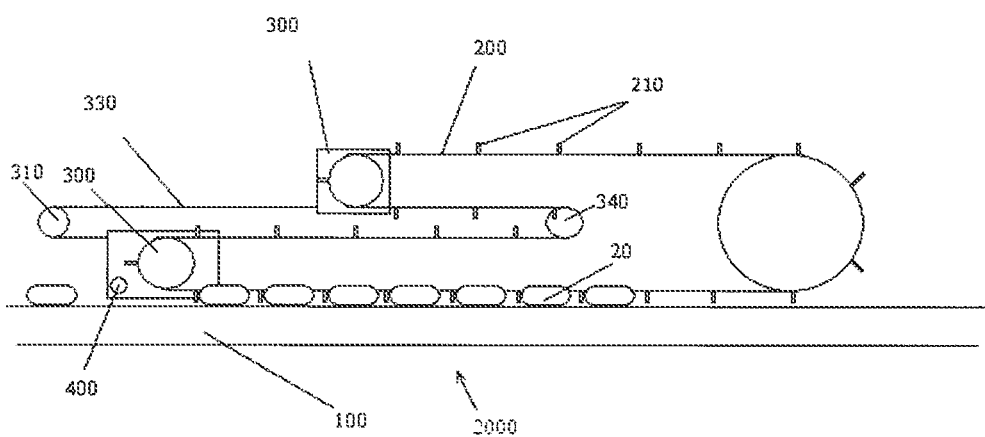
FIG. 2 is a schematic side view of a second embodiment of the invention.
Figure 3:
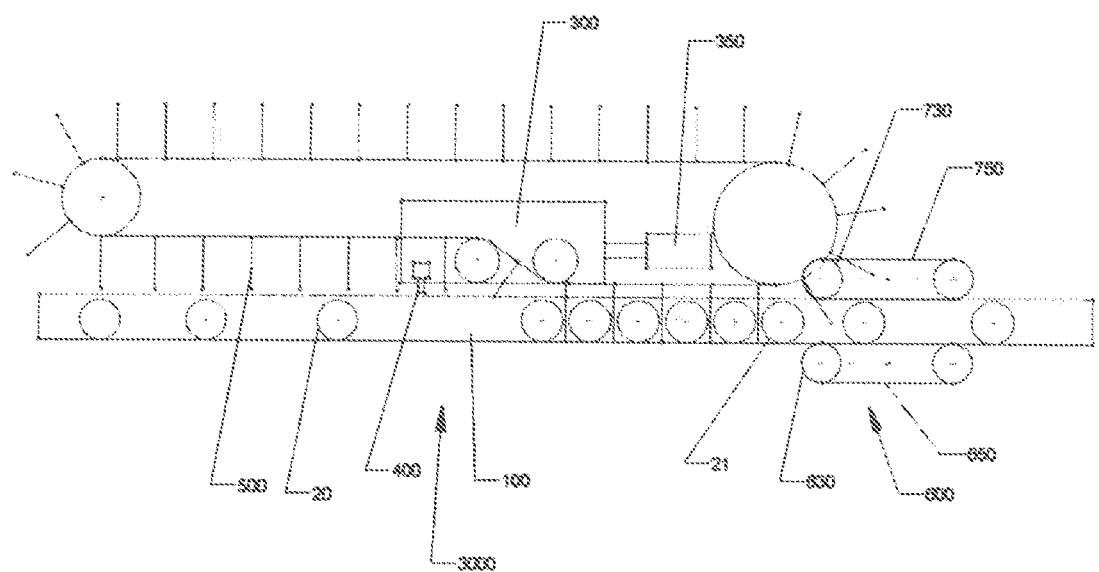
FIG. 3 is a schematic plan view of a third embodiment of the invention

As shown in FIG. 2, apparatus 2000 comprises a support and transfer conveyor 100 which conveys objects 20 trough an object space. as objects 20 are detected by the sensor 400, the shuttles 300 are moved to adjust the number of flights 210 passing through the object space. The two shuttles 300 are linked to the shuttle drive 310 via a belt or other motion control element. The two shuttles move in coordination. As one shuttle moves to the right of the apparatus the other shuttle undergoes a compensating motion to the left. The motion of the shuttles serves to increase or decrease the extent to which the carrier 200 and flights 210 overlap the object space. As shown in FIG. 3, apparatus 3000, comprises object capture elements 500. The transport conveyor 100 carries objects 20 through an object space. The shuttle 300 is moved via actuator 350 as incoming objects are detected by the sensor 400. The movement of the shuttle 300 alters the number of path of object capture element 500 in the object space separating objects 20. Re-pitching element 600 receives objects from the object capture element and alters the relative spacing of the objects via altering the speed of re-pitching motion transfer elements 650 and 750. Non-linear gears 630 and 730 increase the gap between the entry point of motion transfer elements 650 and 750 as the incoming object 21 is transferred from the object capture elements 500 into the repitching element 600. Once the incoming object 21 is transferred into the repitching element 600, the gap between the motion transfer elements 650 and 750 is decreased to grip the object.

An optional means to provide transport stability to unstable objects can be provided. This means could for example be a top belt that travels at the same rate as the lower infeed conveyor. This stability means could release custody of the object when the object capture element is acquiring the object.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An object transport apparatus comprising:
   a. a transport conveyor having an object space adjacent to the transport conveyor;
   b. a first plurality of flights disposed along a variable path and constrained to move along that path, a variable portion of the path disposed adjacent to the transport conveyor, wherein the flights disposed along the adjacent portion occupy a portion of an object space of the transport conveyor;
   c. a first transfer element disposed along the variable path wherein the motion of the first transfer element varies the length of the variable path adjacent to the transport conveyor;
   d. an object sensor disposed to detect objects upstream of the transfer element, wherein the sensor is attached to and moves with the first transfer element;
   e. a controller which interacts with a transfer element drive to alter the position of the transfer element along the variable path according to the output of the sensor.

2. The object transport apparatus of claim 1 wherein the first plurality of flights are attached to a common first flight carrier element which first flight carrier element is compelled to traverse the variable path.

3. The object transport apparatus of claim 1 further comprising a second transfer element, wherein the second transfer element moves in opposition to the motion of the first transfer element.

4. The object transfer apparatus of claim 2 further comprising a stabilizing element disposed adjacent to the flight carrier element and attached to the first transfer element.

5. The object transfer apparatus of claim 1 further comprising a second plurality of flights disposed along the same variable path, the spacing of the second plurality of flights with respect to the first plurality of flights being adjustable.

6. The object transport apparatus of claim 5 wherein the second plurality of flights are attached to a common second flight carrier element which second flight carrier element is compelled to traverse the variable path.

7. The object transport apparatus of claim 1 further comprising a re-pitching element disposed adjacent to the variable path and the object space.

8. An object transport apparatus comprising:
   a. a transport conveyor having an object space adjacent to the transport conveyor;
   b. a first object capture element disposed along a variable path and constrained to move along that path, a variable portion of the path disposed adjacent to the transport conveyor, wherein the object capture element disposed along the adjacent portion occupy a portion of an object space of the transport conveyor;
   c. a first transfer element disposed along the variable path wherein the motion of the first transfer element varies the length of the variable path adjacent to the transport conveyor;
   d. a second object capture element disposed along the path of the transport conveyor opposite the first object capture element and occupying a portion of the object space;
   e. an object sensor disposed to detect objects upstream of the transfer element;
   f. a controller which interacts with a transfer element drive to alter the position of the transfer element along the variable path according to the output of the sensor.

9. The object transport apparatus of claim 8 further comprising a second transfer element, wherein the second transfer element moves in coordination with the motion of the first transfer element.

10. The object transfer apparatus of claim 8 wherein the sensor is attached to and moves with the first transfer element.

11. The object transfer apparatus of claim 8 further comprising a stabilizing element disposed adjacent to the flight carrier element and attached to the first transfer element.

12. The object transfer apparatus of claim 8 further comprising a mechanism disposed in contact with the first object capture element and adapted to alter the extent to which a portion of the first object capture elements along the variable path extend into the object space.

13. The object transport apparatus of claim 8 further comprising a re-pitching element disposed adjacent to the variable path and the object space.

14. A method for transporting discrete objects along a path, the method comprising steps of:
   a. providing an object capture element adjacent to a transport conveyor and occupying a portion of an object space of the conveyor;
   b. providing a first transfer element disposed along a variable path, wherein the motion of the first transfer element varies the length of the variable path adjacent to the transport conveyor;
   c. providing an object sensor disposed to detect objects upstream of the first transfer element, wherein the sensor is attached to and moves with the first transfer element;
   d. sensing an object within the object space of the transport conveyor;
   e. altering a variable path of the object capture element to capture the object;
   f. transporting the captured object in the object space along the transport conveyor.

15. The method according to claim 14 further comprising the step of transferring the captured object to a downstream object handling element.

16. The method according to claim 15 further comprising the step of altering the pitch of the transferred object with the downstream object handling element.

\* \* \* \* \*